United States Patent
Provenza (10) Patent No.: US 11,279,483 B2
(45) Date of Patent: Mar. 22, 2022

(54) MODULAR WEAPON CARRIAGE AND DEPLOYMENT (MWCD) SYSTEM

(71) Applicant: Government of the United States, as represented by the Secretary of the Air Force, Wright-Patterson AFB, OH (US)

(72) Inventor: Jerry Provenza, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 628 days.

(21) Appl. No.: 16/190,711

(22) Filed: Nov. 14, 2018

(65) Prior Publication Data

US 2020/0148355 A1 May 14, 2020

(51) Int. Cl.
*B64D 1/00* (2006.01)
*B64D 7/00* (2006.01)
*F41F 3/06* (2006.01)

(52) U.S. Cl.
CPC .............. *B64D 1/00* (2013.01); *B64D 7/00* (2013.01); *F41F 3/06* (2013.01)

(58) Field of Classification Search
CPC .... B64D 1/00; B64D 7/00; B64D 1/04; F41F 3/06
See application file for complete search history.

(56) References Cited

U.S. PATENT DOCUMENTS

| | | | | |
|---|---|---|---|---|
| 2,621,565 A | * | 12/1952 | Laddon | F42B 39/26 89/1.51 |
| 3,122,056 A | * | 2/1964 | Fitch | F41F 3/06 89/1.51 |
| 3,766,829 A | * | 10/1973 | Cords | F41F 3/06 89/1.815 |
| 4,589,615 A | * | 5/1986 | Walker, Jr. | B64D 1/04 244/118.1 |
| 4,702,145 A | * | 10/1987 | Kannapell | B64D 1/06 244/137.4 |

* cited by examiner

*Primary Examiner* — Timothy D Collins
*Assistant Examiner* — Terri L Filosi
(74) *Attorney, Agent, or Firm* — AFMCLO/JAZ; David E. Franklin (57) ABSTRACT

A modular weapon carriage and deployment (MWCD) system includes a strongback structure mountable to an aircraft. Left and right guide struts have respective upper ends attached to the strongback structure in spaced lateral positions. Each guide strut extends downward in a parallel arrangement. Each guide strut comprising a vertically-extending first engaging surface. Left and right suspension modules are engageable to opposite lateral sides of a first airborne store. Each suspension module includes a vertical channel that receives the engaging surface of the corresponding one of the left and right guide struts for relative vertical translation. A locking mechanism controllably locks to first engaging surface of the corresponding one of the left and right guide struts.

16 Claims, 12 Drawing Sheets

FIG. 18

MODULAR WEAPON CARRIAGE AND DEPLOYMENT (MWCD) SYSTEM

ORIGIN OF THE INVENTION

The invention described herein was made by employees of the United States Government and may be manufactured and used by or for the Government of the United States of America for governmental purposes without the payment of any royalties thereon or therefore.

CROSS-REFERENCE TO RELATED APPLICATIONS

This application claims the benefit of priority under 35 U.S.C. § 119(e) to U.S. Provisional Application Ser. No. 62/729,667 entitled "Modular Weapon Carriage and Deployment (MWCD) System", filed Sep. 11, 2018, the contents of both of which is incorporated herein by reference in its entirety.

BACKGROUND

1. Technical Field

The present disclosure generally relates to weapon suspension assemblies, and more particularly to weapon suspension assemblies that enable multiple weapons to be carried in a stacked arrangement.

2. Description of the Related Art

Conventional suspension and release equipment (S&RE) systems are costly, heavy and reusable to withstand the mechanical stress, fatigue and environmental elements over a 20 to 30 year life span. The reuse requirement requires regular inspections and maintenance. In addition, S&RE systems are subject to prolonged stress and fatigue, material corrosion, and other detrimental long term effects. After the weapons have been deployed, the resultant weight of conventional S&RE systems is parasitic and subtracts from the delivering aircraft performance and fuel economy. Most significantly, conventional S&RE systems are inefficient. Conventional S&RE systems occupy or displace limited internal weapons bay space that could be utilized for the carriage of additional weapons and/or fuel. Because of this limitation, in most cases, only one weapon can be carried per internal weapon bay station independent of the size and weight.

Conventional S&RE system are not produced for any one specific aircraft, but are intended to be used across as much of the combined fleet as possible. This in turn requires a mechanical interface or adapter that must be used between the S&RE system and any one particular aircraft type. Since these adapters must be capable of handling all the loads of the S&RE system, the S&RE systems are massive and heavy adding to the weight of the conventional S&RE system. These adapter are unique to every aircraft and in most cases to every weapon. The inventory management of these adapters are a costly burden that must be managed for conventional S&RE systems to be effective.

BRIEF SUMMARY

In one aspect, the present disclosure provides a modular weapon carriage and deployment (MWCD) system having a strongback structure mountable to an aircraft. Left and right guide struts have respective upper ends attached to the strongback structure in spaced lateral positions. Each guide strut extends downward in a parallel arrangement. Each guide strut comprising a vertically-extending first engaging surface. Left and right suspension modules are engageable to opposite lateral sides of a first airborne store. Each suspension module includes a vertical channel that receives a corresponding one of the left and right guide struts for relative vertical translation. A locking mechanism controllably locks to first engaging surface of the corresponding one of the left and right guide struts.

In one aspect, the present disclosure provides an aircraft having an airframe that suspends and releases airborne stores using one or more MWCD systems.

In one aspect, the present disclosures provides a method of suspending and releasing an airborne store on an aircraft. In one or more embodiments, the method includes engaging left and right support modules to lateral sides of an airborne store. The method includes raising the airborne store so that left and right guide struts are received from above into vertical channels of left and right suspension modules. Each guide strut has a vertical toothed rack that gear meshes with a pinion gear within a respective vertical channel. The method includes continuing to raise the airborne store causing a store retention pin in the respective vertical channel to ratchet against the toothed rack of the respective guide strut. The method includes allowing the airborne store to transfer its weight to the guide struts in response to reaching full upward travel up against either a strongback structure or upper airborne store that is supported on the same guide struts. The method includes simultaneously applying torque to preload actuators on each suspension module to preload the left and right suspension modules, structurally securing the airborne store to the aircraft.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

A modular weapon carriage and deployment (MWCD) system includes a strongback structure mountable to an aircraft. Left and right guide struts have respective upper ends attached to the strongback structure in spaced lateral positions. Each guide strut extends downward in a parallel arrangement. Each guide strut comprising a vertically-extending first engaging surface. Left and right suspension modules are engageable to opposite lateral sides of a first airborne store. Each suspension module includes a vertical channel that receives a corresponding one of the left and right guide struts for relative vertical translation. A locking mechanism controllably locks to first engaging surface of the corresponding one of the left and right guide struts.

In one or more embodiments, a purpose of this Modular Weapon Carriage & Deployment (MWCD) system provides a high performance, low cost, light weight, and high efficiency Suspension & Release Equipment (S&RE) system for air-to-air and air-to-ground weapons. It is critical that US and allied partner tactical aircraft be able to carry the maximum number of weapons per aircraft sortie. This minimizes the number of sorties required to prosecute selected targets which in turn reduces operational costs and minimizes risks and exposure of aircrews and tactical assets to adversarial counter defense systems.

One application of the present innovation is for the carriage and deployment of air-to-air and air-to-ground weapons. MWCD) system supports the operation of a low cost of operation, efficient, light weight, and high performance S&RE system that leads to maximum weapon aircraft loadouts. The reduced residual or parasitic weight allows for additional weapons carriage. The major components of this MWCD system include suspension modules, passive strongback and guide struts.

In one or more embodiments, there are several major or significant advantages of this Modular Weapon Carriage & Deployment (MWCD) system over conventional S&RE systems. Firstly, MWCD system supports the maximum possible weapon loadouts. The space that would be allocated for conventional S&RE systems can be reallocated for additional weapons. This reduces the number of sorties and aircrew exposure. Secondly, since most of the carriage & deployment components are ejected along with the weapon, very little mass and weight is remaining that needs to be transported back for maintenance and refurbishment. This contributes to increased tactical aircraft performance, fuel economy, and operations and support (O&S) cost savings. The pieces of the system that are reused are the relatively simple, low or zero maintenance and passive elements of the system. That includes the strong back and guide struts. Lastly, this modular weapon carriage & deployment system will result in significant cost saving. Unlike conventional S&RE systems, it only has to be used once, eliminating inventory record keeping, periodic inspections, back shops, depot support, maintenance records, spare parts, special training, and inspection/overhaul labor hours.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
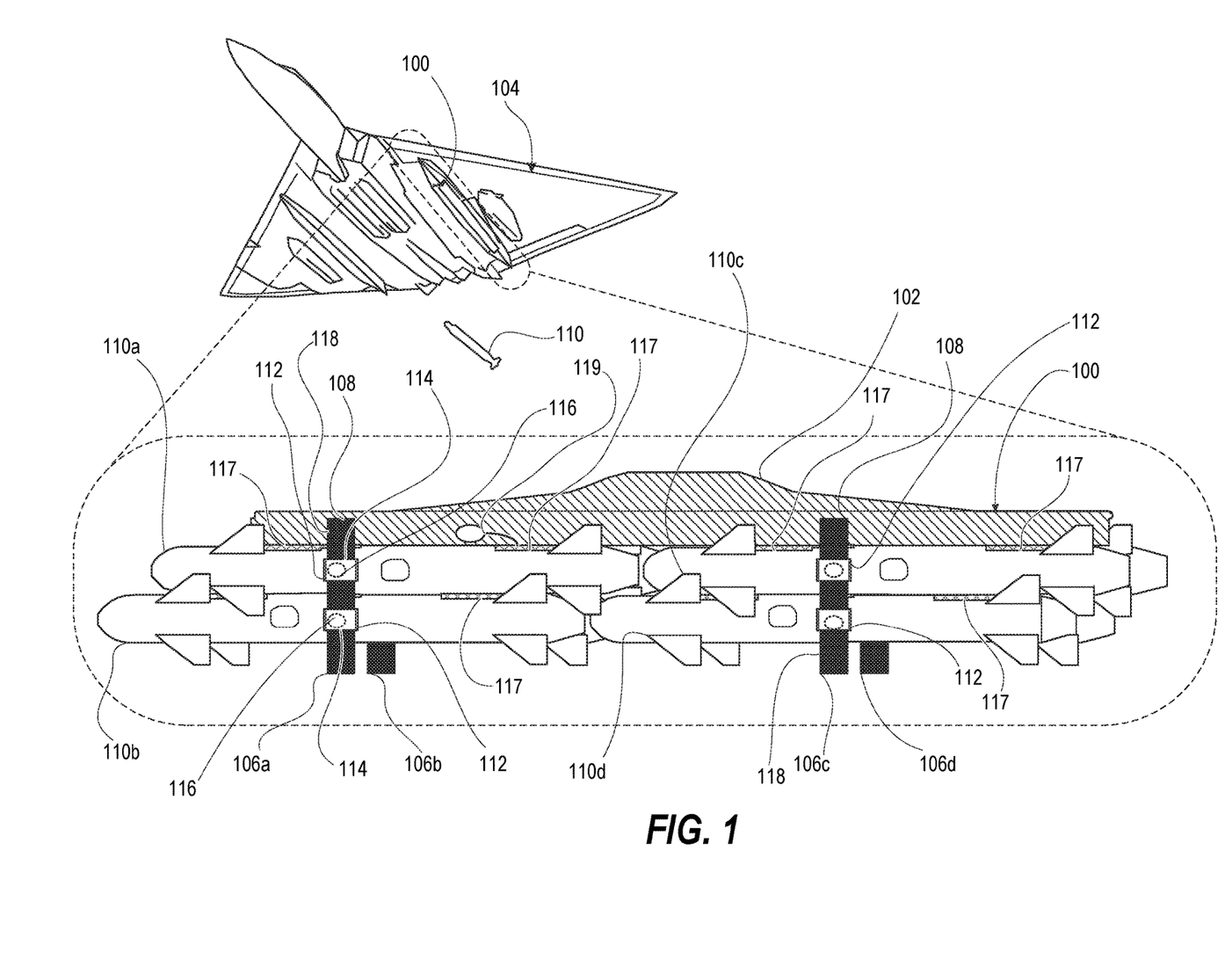
FIG. 1 is an isometric view illustrating an aircraft releasing a munition and with a side view of a loaded modular weapon carriage and deployment (MWCD) system, according to one or more embodiments.

FIG. 1 illustrates a modular weapon carriage and deployment (MWCD) system 100 that includes a strongback structure 102 that is mountable either temporarily or permanently to an aircraft 104 that releases airborne stores 110. The strongback structure 102 is the mechanical interface between the aircraft 104 and the MWCD system 100. The strongback structure 102 transfers all the loads from the MWCDS to the aircraft 104. A front pair of left and right guide struts 106a, 106b have respective upper ends 108 attached to the strongback structure 102 in spaced lateral positions. Front pair of left and right guide struts 106a, 106b extend along respective lateral sides of a vertical stack of first and second airborne stores 110a, 110b. Left and right suspension modules 112 are engaged to opposite lateral sides of the first and second airborne store 110a, 110b. A respective guide strut 106a, 106b passes through a vertical channel 114 of each suspension module 112. A locking mechanism 116 controllably locks to a corresponding engaging surface 118 of one of the left and right guide struts 106a, 106b. Similarly, an aft pair of left and right guide struts 106c, 106d support an aft vertical stack of airborne stores 110c, 110d. In one or more embodiments, MWCD system 100 has guide struts 106a-106d positioned close to the center of gravity (CG) of respective airborne stores 110a-110d. Ejection bladders 117 are positioned between airborne stores 110a, 110c and strongback structure 102 and between top and bottom airborne stores 110a-110b, 110c-110d to minimize direct contact during flight and to cause separation during release. Gas generating canister or container 119 rapidly inflates a selected ejection bladder 117 during a release sequence.

Airborne store 110 can be various types of payloads that are carried externally or within a weapons bay of an aircraft that require the ability to be released during flight. Release or firing can be operationally required, such as releasing a munition or airborne deployable payload. Release can be performed in response to needing to reduce aerodynamic drag, such as dropping fuel tanks in preparation for air-to-air combat or an emergency landing. Examples of munitions include canisters that dispense bomblets, flare parachutes, etc. Munitions include torpedoes, bombs, rockets, missiles, reconnaissance drones, target drones, etc. Airborne stores can contain emergency supplies for ground personnel.

Figure 2:
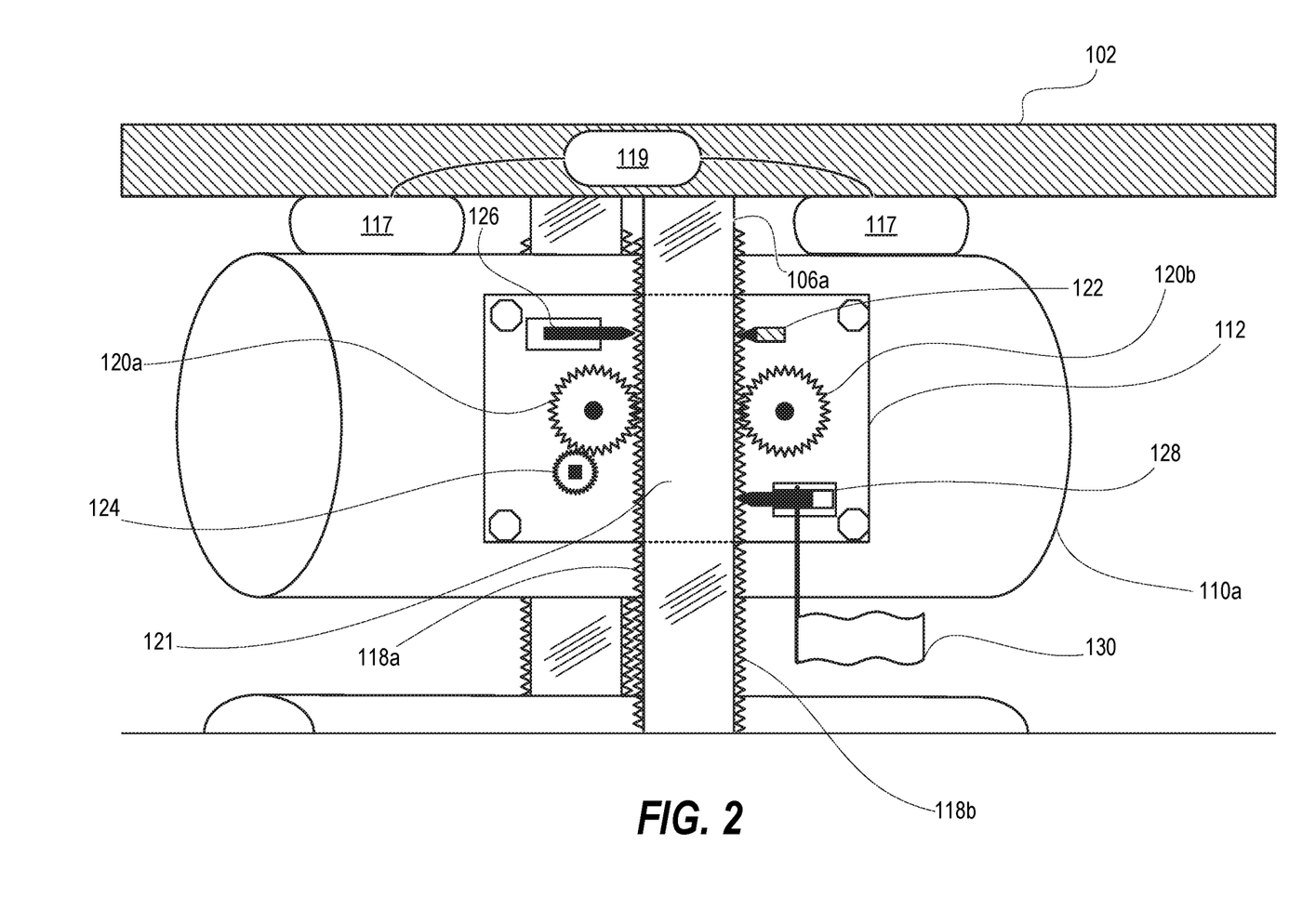
FIG. 2 is a side diagrammatic view illustrating a suspension module of the MWCD system attached to an airborne store, according to one or more embodiments.
Figure 3:
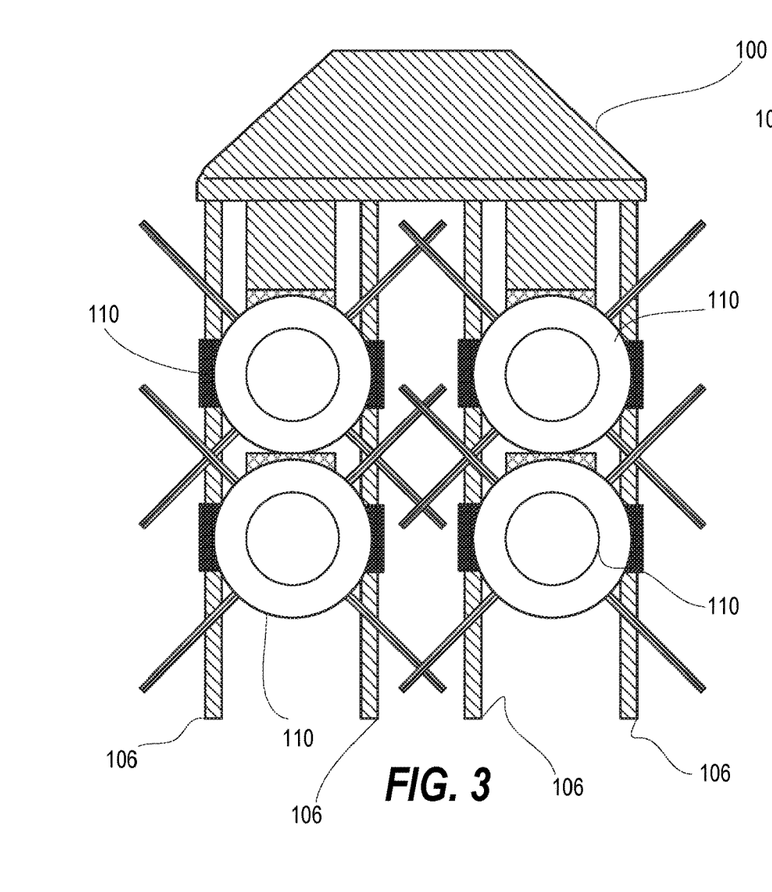
FIG. 3 is a rear side view illustrating the loaded MWCD system, according to one or more embodiments.
Figure 4:
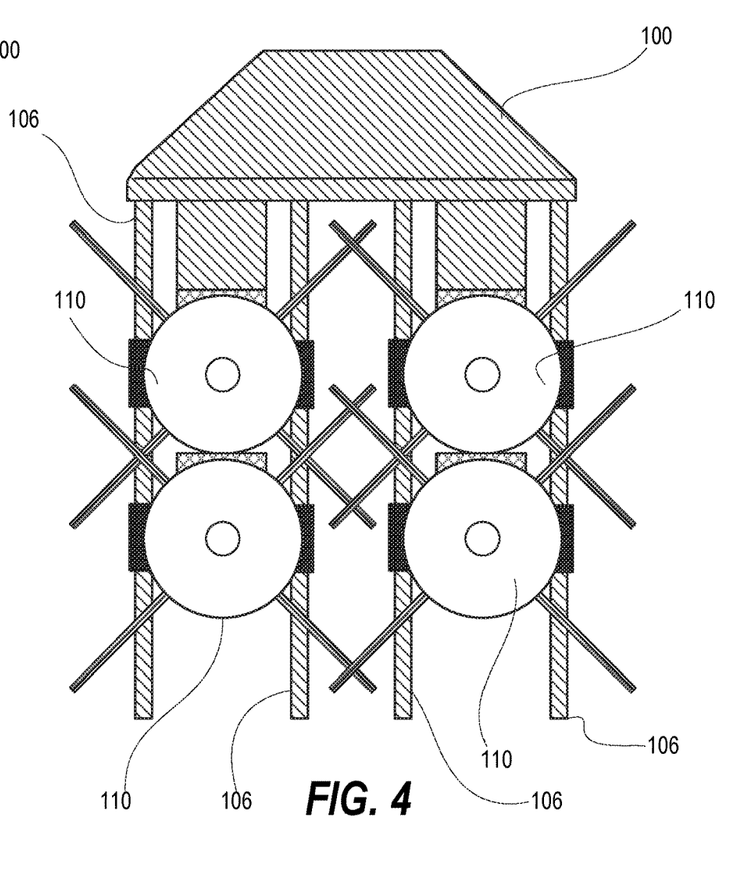
FIG. 4 is a front side view illustrating the loaded MWCD system, according to one or more embodiments.
Figure 5:
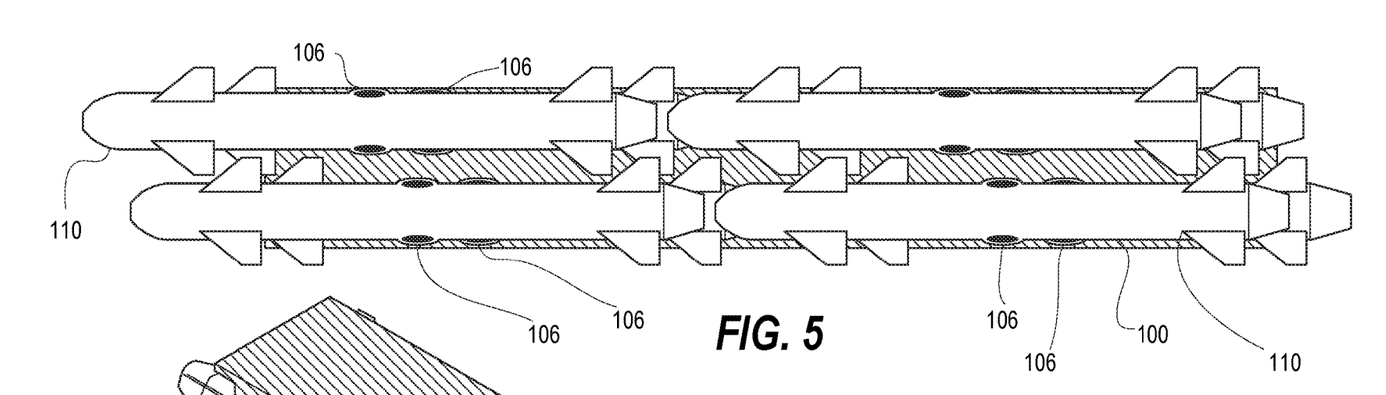
FIG. 5 is a bottom side view illustrating the loaded MWCD system, according to one or more embodiments.
Figure 6:
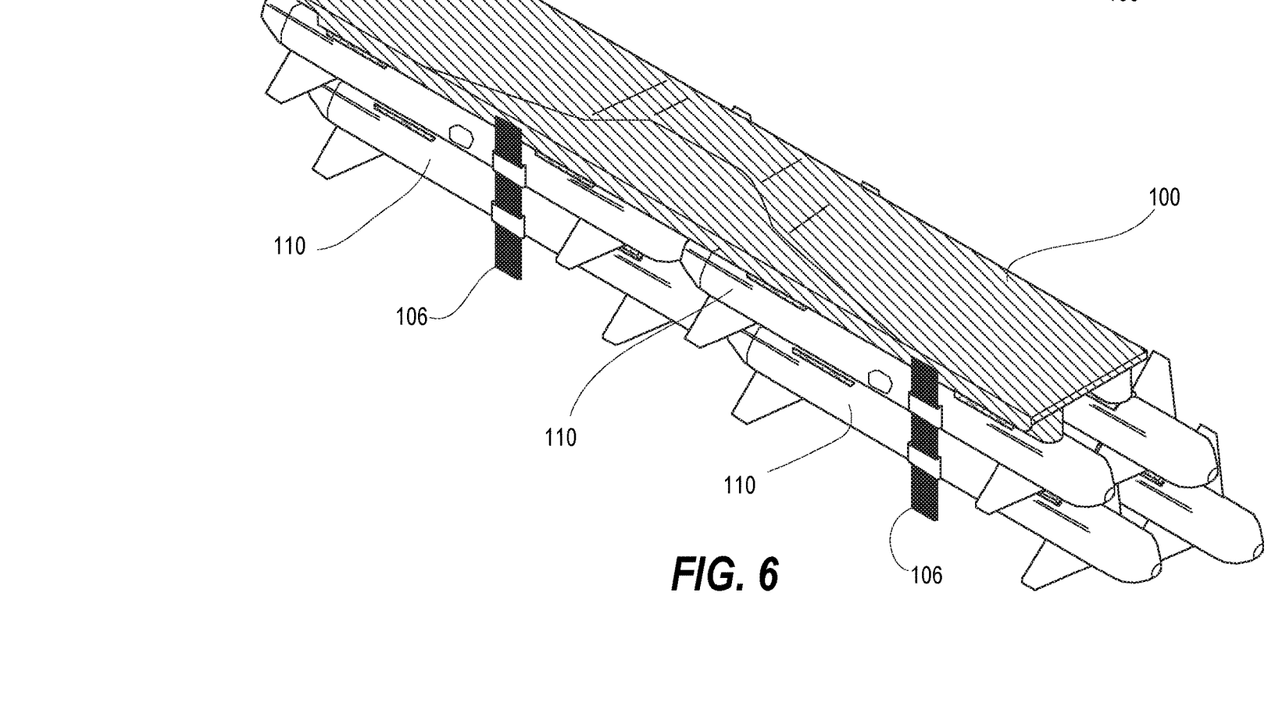
FIG. 6 is a top right and front isometric view illustrating the loaded MWCD system, according to one or more embodiments.

FIG. 2 illustrates an exemplary suspension module 112 that works together with the guide strut 106a and strongback structure 102. The suspension module 112 mechanically attaches to the airborne store 110a. The suspension module 112 is expendable and can either stay with the airborne store 110a after ejection or can be released to increase aerodynamic efficiency of the airborne store 110a. The suspension module 112 utilizes the guide strut 106a for weapon carriage, preloading, inflight safing, ground safing, and weapon trajectory control. In one or more embodiments, the suspension module 112 uses forward and aft pinion gears 120a, 120b that engage respectively front and aft toothed engaging surfaces 118a, 118b of a rack structure 121 of the guide strut 106a. The pinion gears 120a, 120b mesh with the toothed engaging surfaces 118a, 118b of the rack structure 121 for registration, locking, and preloading. The mechanisms inside the suspension module 112 allow the airborne store 110a to be loaded or raised up the guide strut 106a until the airborne store 110a makes initial contract with the strongback structure 102 or any upper tier airborne store. The ratchet action of a store release pin (SRP) 122 allows the airborne store 110a to be raised but the airborne store 110a cannot be lowered until a store down load control mechanism is actuated or a commanded ejection event is initiated. A tool can be used to apply a preload to a specified torque value that is pre-calculated according to store mass to a preload mechanism 124 that engages front pinion gear 120a. A reversible inflight lock (RIFL) 126 is engaged at all times. The RIFL 126 prevents the airborne store 110a from traveling down the guide strut 106a even if an unintentional ejection force is applied. This RIFL 126 is spring loaded biased towards the safe or locked position. An external circuit current is applied to the control mechanism to drive the RIFL 126 into an unlocked or operational condition. The airborne store 110a can only be ejected once the RIFL 126 has been commanded to the unlock position. The SRP 122 engages with the guide strut 106a at all times. The SRP 122 is designed to safely hold the airborne store 110a in the carriage position under maximum carriage loads, plus a nominal safety factor, and to fail or release the airborne store under a minimum ejection load threshold. Ground safing pin (GSP) 128 is used to ensure that an ejection event cannot occur while the aircraft 104 is on the ground. The GSP 128 is attach to a red, remove before flight flag 130. GSP 128 is removed prior to flight to enable normal operation.

In one or more embodiments, suspension module 112 can be designed to be integral and internal to an airborne store 110a to not introduce aerodynamic drag. In one or more embodiments, suspension module 112 is externally attached to the airborne store 110a and presents a streamlined shape to minimize additional drag while remaining with the airborne store 110a. In one or more embodiments, suspension module 112 is releasable from the airborne store 110a after separating from guide struts 106a, 106b.

Figure 7:
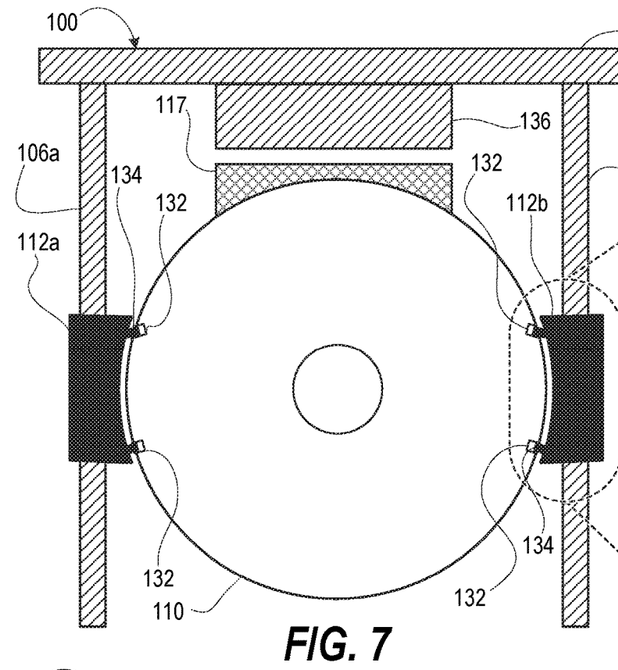
FIG. 7 is a front view of an airborne store being raised on the MWCD system, according to one or more embodiments.
Figure 10:
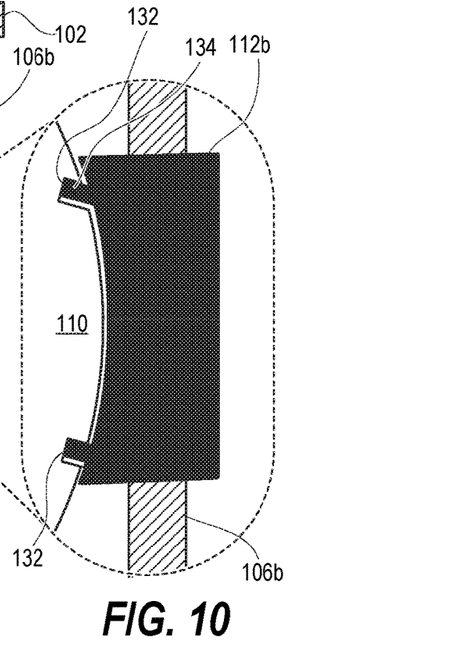
FIG. 10 is a front detail view of preloaded suspension module fully engaged to the airborne store, according to one or more embodiments.
Figure 11:
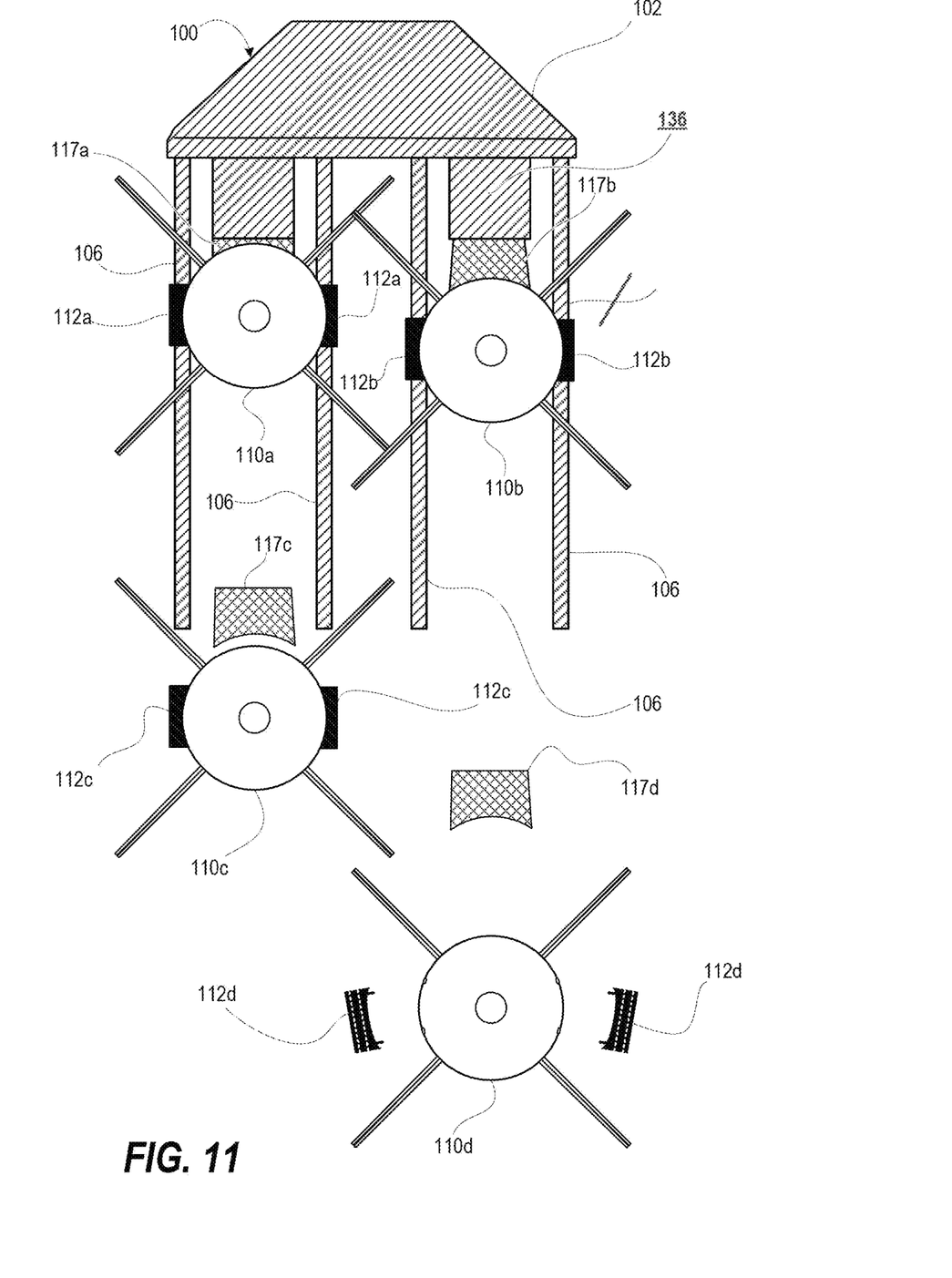
FIG. 11 is a front side view illustrating the loaded MWCD system with four airborne stores at various stages of being released, according to one or more embodiments.

FIGS. 3-6 illustrate the MWCD system 100 loaded with four pair of vertically stacked airborne stores 110 that are respectively suspended by a respective pair of left and right guide struts 106 aligned with two in front and two aft. FIGS. 7 11 illustrate example MWCD system 100 having a passive preloading capability that allows left and right suspension modules 112 to fall away from airborne store 110 after release.

Figure 8:
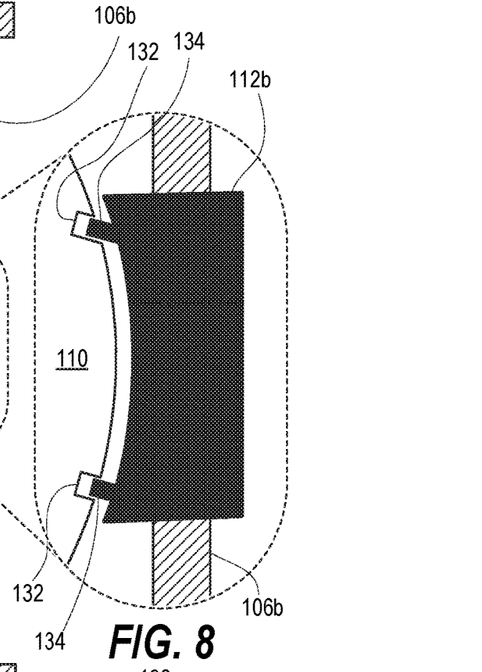
FIG. 8 is a front detail view of an unloaded suspension module partially engaged to the airborne store, according to one or more embodiments.

FIG. 7 is a front view of airborne store 110 being raised on MWCD system 100. Suspension modules 112a, 112b engage respective guide struts 106a, 106b such that the airborne store 110 is allowed to be raised but not to fall. Pin receptacles 132 formed in an outer surface of airborne store 110 receive pins 134 extending inwardly from suspension modules 112a, 112b. FIG. 8 illustrates an exaggerated spacing between suspension modules 112a, 112b and airborne store 110 to indicate no preloading force. Guide struts 106a, 106b provide structural support to position suspension modules 112a, 112b against airborne store 110. In addition, pins 134 extending inwardly from suspension modules 112a, 112b into pin receptacles 132 of airborne store 110 with sufficient frictional engagement to allow hoisting of the airborne store 110 upward against strongback structure 102. With continued reference to FIG. 7, ejection bladder 117 is placed in a deflated, unactuated state between airborne store 110 and pylon 136 of strongback structure 102.

Figure 9:
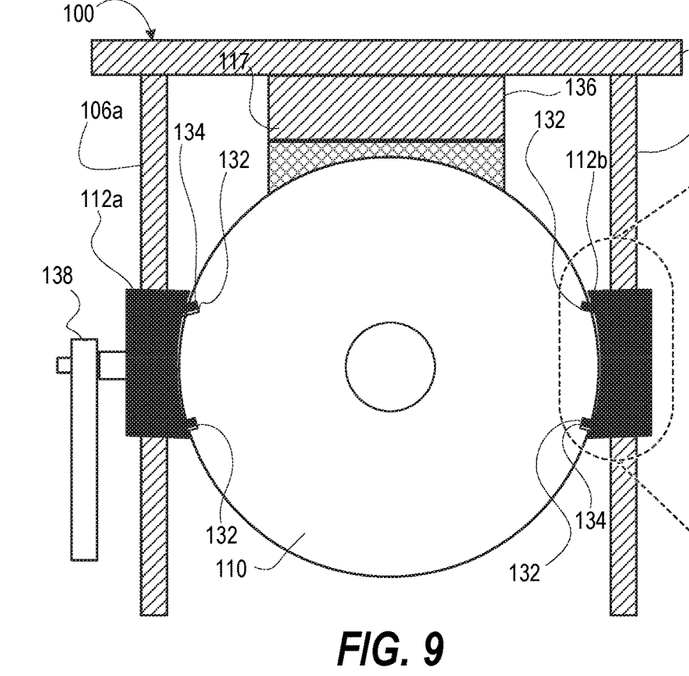
FIG. 9 is a front view of the full-raised airborne store being preloaded by the MWCD system, according to one or more embodiments.

FIG. 9 illustrates full-raised airborne store 110 that is being preloaded via tool 138 used on each suspension modules 112a, 112b of MWCD system 100. Strongback structure 102 prevents further raising. FIG. 10 illustrates that preloading causes pins 134 of suspension modules 112a, 112b to tightly extend further inwardly into pin receptacles 132 of airborne store 110 and to pull guide struts 106a, 106b inwardly. With continued reference to FIG. 9, preloading locks MWCD system 100 and airborne store 110 together. Preloaded MWCD system 100 maintains airborne store 110 in position against strongback structure 102, withstanding movement during ground and flight operations.

FIG. 11 is a front side view illustrating the loaded MWCD system 100 with four (4) airborne stores 110a-110d at various stages of being released. Airborne store 110a is suspended by suspension modules 112a in a preloaded on guide struts 106 and secured condition with ejection bladder 117a deflated. Airborne store 110b is guided downward on guide struts 106 by suspension modules 112b that were released in part by actuation of ejection bladder 117b against pylon 136 of strongback structure 102. Airborne store 110c has dropped below guide struts 106 with suspension modules 112c momentarily against airborne store 110c. Expended ejection bladder 117c is allowed to depart from airborne store 110c. Airborne store 110d has dropped further below guide struts 106 with suspension modules 112d separating from airborne store 110c due air flow or compression spring. Expended ejection bladder 117d has departed behind airborne store 110c due to high air drag.

Figures 12, 13A, 13B:
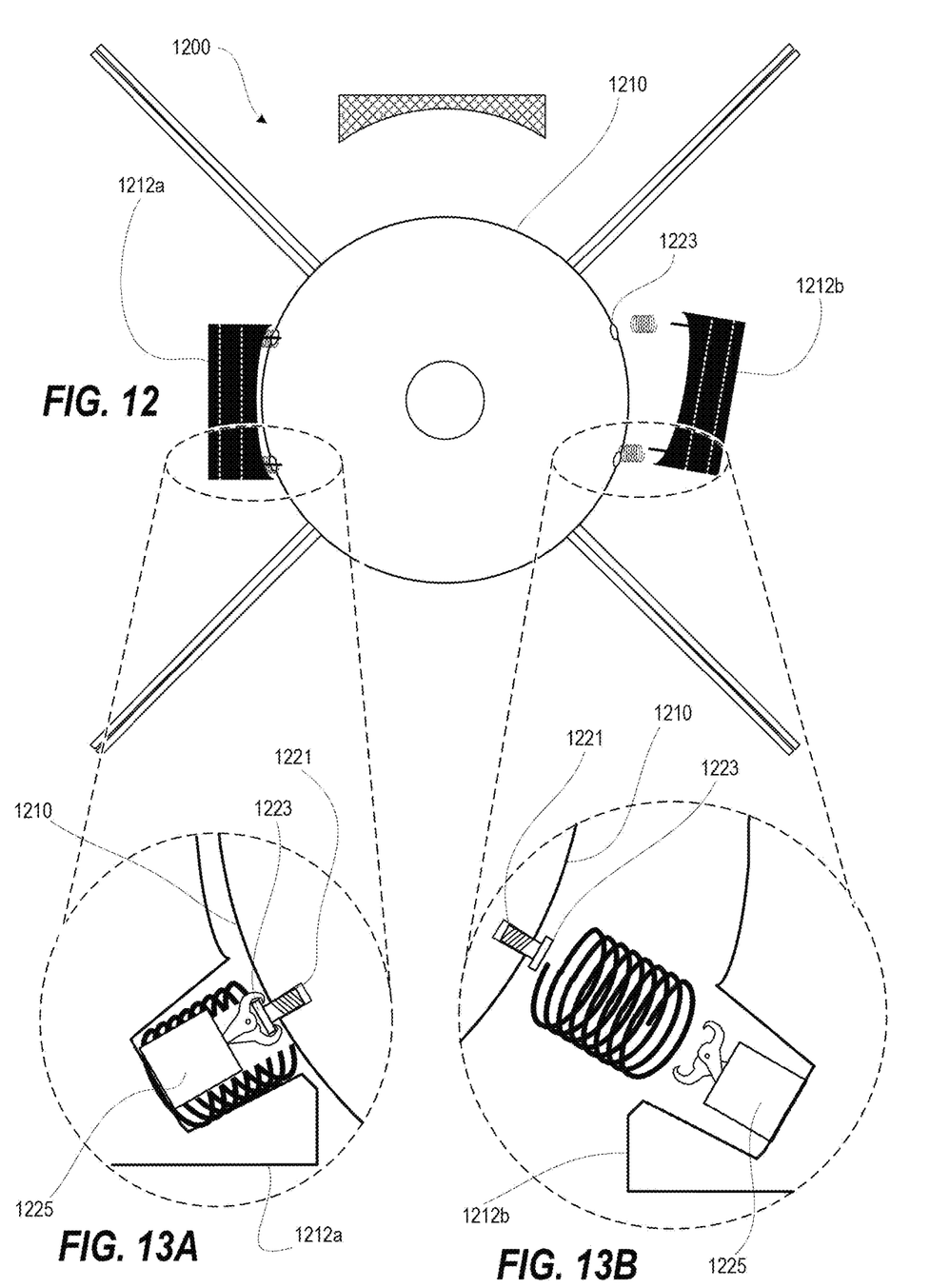
FIG. 12 is a front side view illustrating a released airborne with detail views of one suspension module engaged and one suspension module released, according to one or more embodiments.
FIG. 13A is a front cutaway detail view of the engaged suspension module of FIG. 12, according to one or more embodiments.
FIG. 13B is a front cutaway detail view of the disengaged suspension module of FIG. 12, according to one or more embodiments.

In one or more embodiments, FIG. 12 illustrates an MWCD system 1200 having an example pair of right and left suspension modules 1212a, 1212b with the former attached and the latter detached from airborne store 1210. Airborne store 1210 includes passive mounting features such as fasteners 1221 with exposed heads 1223. Electrically-actuated latches 1225 recessed in the suspension modules 1212a, 1212b are actuated to release the latches 1225 from the fasteners 1221. FIG. 13A illustrates engaged suspension module 1212a. FIG. 13B illustrates disengaged suspension module 1212b.

Figure 14A:
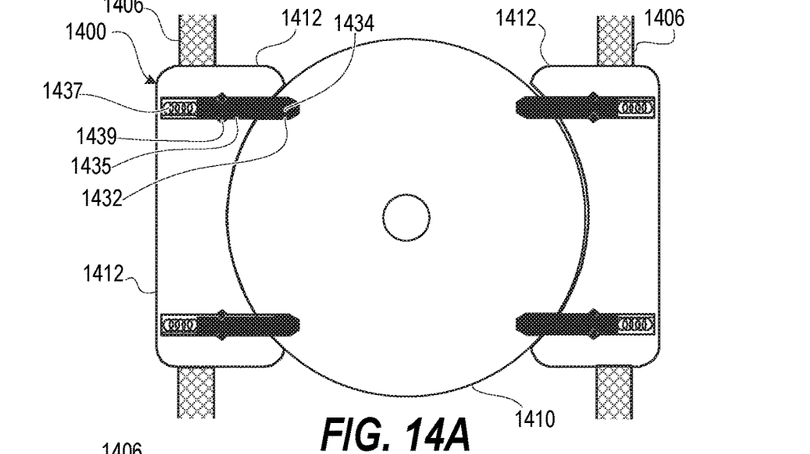
FIG. 14A is a front cutaway view of an example engaged suspension module locked and engaged to an air-to-air airborne store, according to one or more embodiments.
Figure 14B:
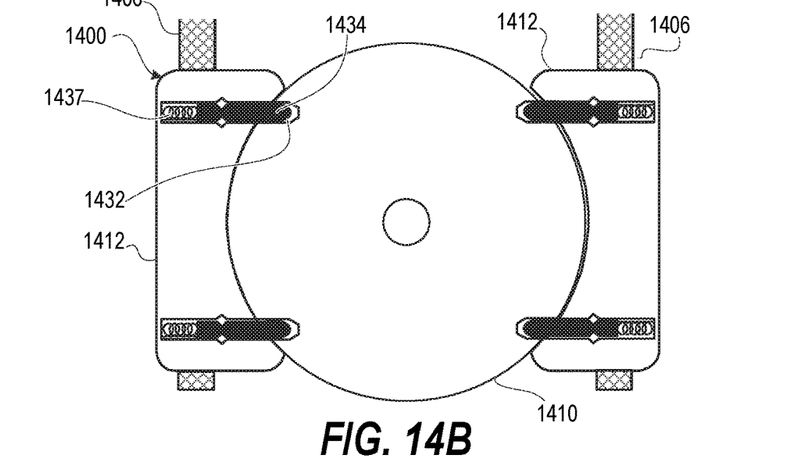
FIG. 14B is a front cutaway view of an example engaged suspension module unlocked and frictionally engaged to the air-to-air airborne store, according to one or more embodiments.
Figure 14C:
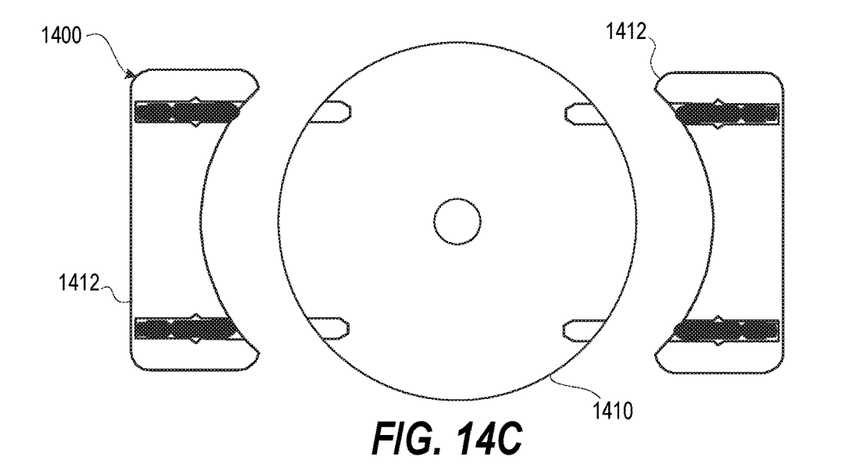
FIG. 14C is a front cutaway view of an example engaged suspension module unlocked and disengaged to the air-to-air airborne store, according to one or more embodiments.

FIGS. 14A-14C illustrate example MWCD 1400 having example suspension modules 1412 with integral and lockable retention pins 1434. Each retention pin 1434 is received for translation within an inwardly open pin bore 1435 formed in a particular suspension module 1412. Retraction spring 1437 is attached between an innermost end of pin bore 1435 and a proximal end of retention pin 1434. When disengaged from airborne store 1410, a locking mechanism such as retractable pin locking yoke 1439 maintains retention pins 1434 in an extended position for insertion into pin receptacles 1432 formed in lateral sides of airborne store 1410.

FIG. 14B illustrates suspension modules 1412 released from respective guide struts 1406, allowing the combination of suspension modules 1412 and airborne store 1410 to descend. Pin locking yoke 1439 (FIG. 14A) is retracted from locking engagement with corresponding retention pins 1434. Frictional binding between each retention pin 1434 and pin receptacle 1432 maintains retention pin 1434 in engagement to airborne store 1410 until ejection forces initiate release of airborne store 1410 from guide struts 1406. During free fall, frictional binding is removed, allowing retraction spring 1437 to retract the retention spring 1434 from pin receptacle 1432 of airborne store 1410. FIG. 14C illustrates suspension modules 1412 full disengaged from airborne store 1410.

In one or more embodiments, airborne store 1410 is an air-to-air munition of a lower weight than typical air-to-ground munitions, allowing guide struts 1406 to be of lightweight design including an internal or recessed channel to carry electrical and optical cables to active components of MWCD 1400 and airborne store 1410. In one or more embodiments, a hollow channel provides a conduit for electrical interface wiring that connects airborne store 1410 to the aircraft for store power during carriage, digital data, store away status, and ejection command signals. The power and data transfer between guide strut 1406 and airborne store 1410 is accomplished through spring loaded power push pins, located on the store side of suspension module 1412, that mates to store contacts directly. This could be used for the data too or alternatively a fiber optic interface could be used.

Figure 15:
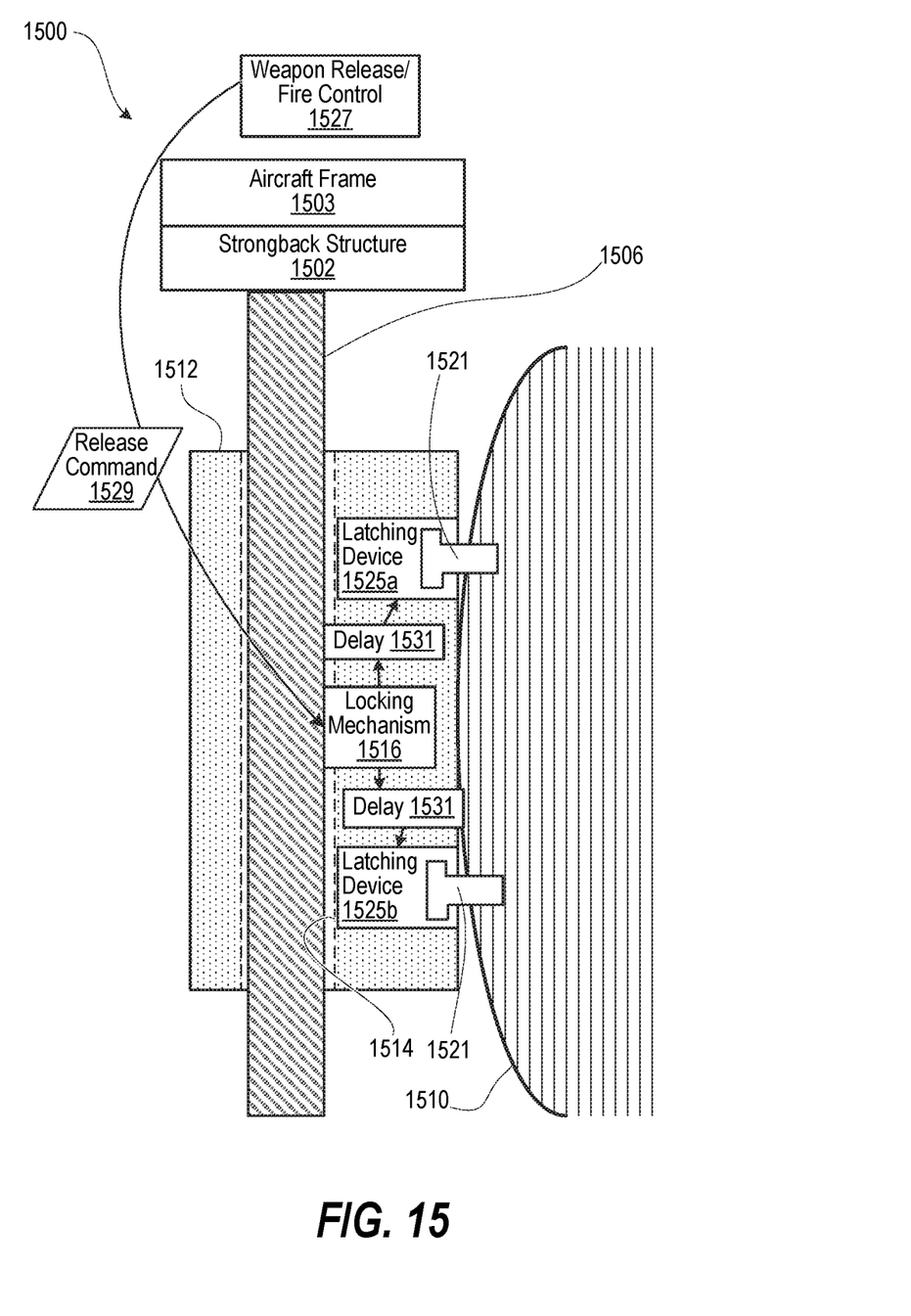
FIG. 15 is a detail diagrammatic view of an example suspension module engaged to an airborne store via an electrically-actuated latching mechanism, according to one or more embodiments.

FIG. 15 illustrates an example MWCD system 1500 having guide struts 1506 attached to strongback structure 1502 that is in turn mounted to an aircraft frame 1503. Guide strut 1506 passes through a vertical channel 1514 to be engaged by a locking mechanism 1516 of suspension module 1512. Suspension module 1512 has top and bottom latching devices 1525a, 1525b that engage respective fasteners 1521 extending from airborne store 1510. A weapon release/fire control system 1527 transmits a release command 1529 that causes the locking mechanism 1516 to disengage from guide strut 1506, allowing airborne store 1510 and attached suspension modules 1512 to drop. Latching devices 1525a, 1525b can receive an electrically or mechanically delayed trigger through delay devices 1531 to release from fasteners 1521.

Figure 16:
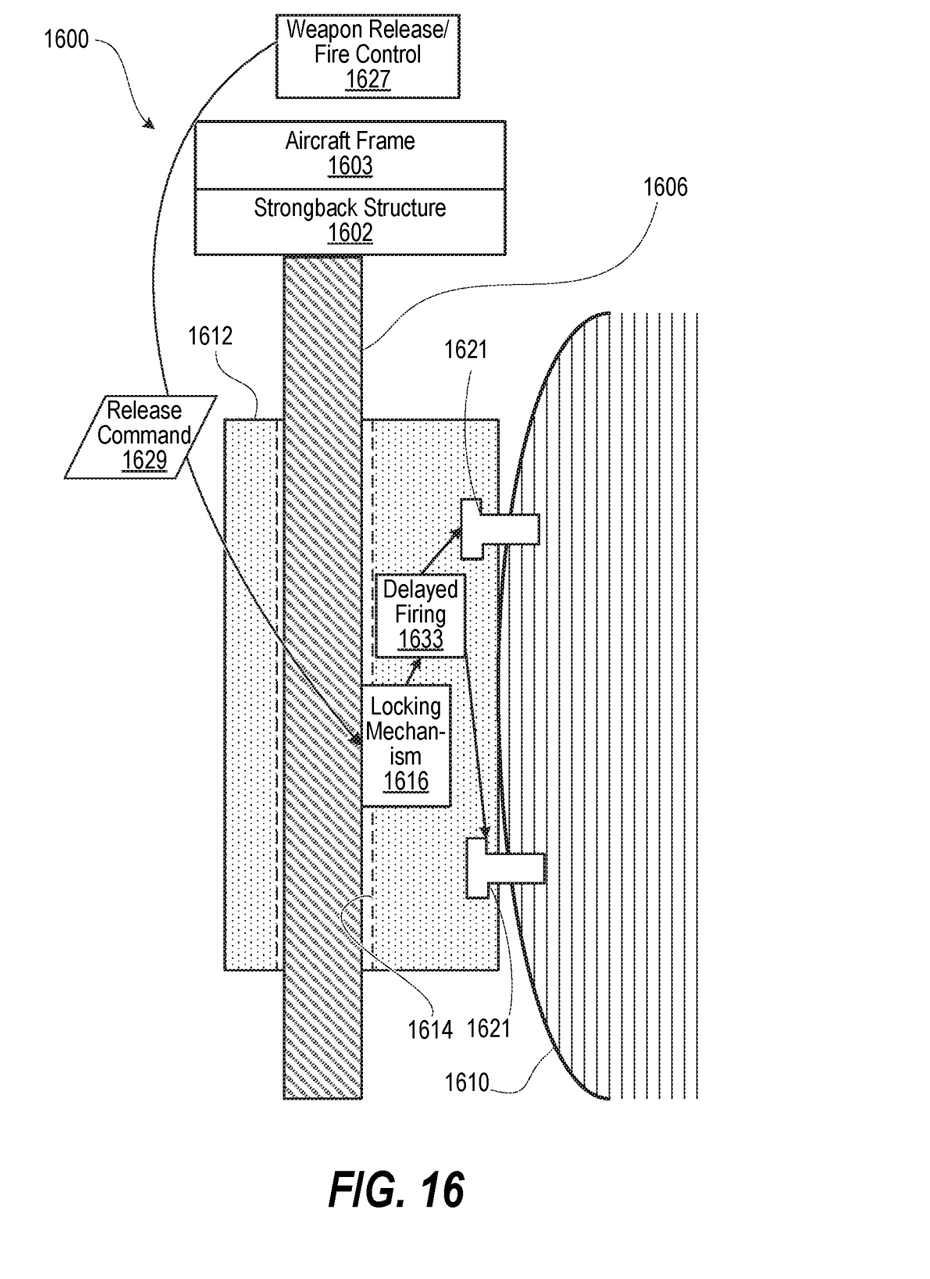
FIG. 16 is a detail diagrammatic view of an example suspension module engaged to an airborne store via pyrotechnic fasteners, according to one or more embodiments.

FIG. 16 illustrates an example MWCD system 1600 having guide struts 1606 attached to strongback structure 1602 that is in turn mounted to an aircraft frame 1603. Guide strut 1606 passes through a vertical channel 1614 to be engaged by a locking mechanism 1616 of suspension module 1612. Suspension module 1612 is engaged to airborne store 1610 by explosive bolt fasteners 1621. A weapon release/fire control system 1627 transmits a release command 1629 that causes the locking mechanism 1616 to disengage from guide strut 1606, allowing airborne store 1610 and attached suspension modules 1612 to drop. Delayed firing module 1633 can receive an electrically or mechanically delayed trigger from locking mechanism 1616 and detonate explosive bolt fasteners 1621.

Figure 17:
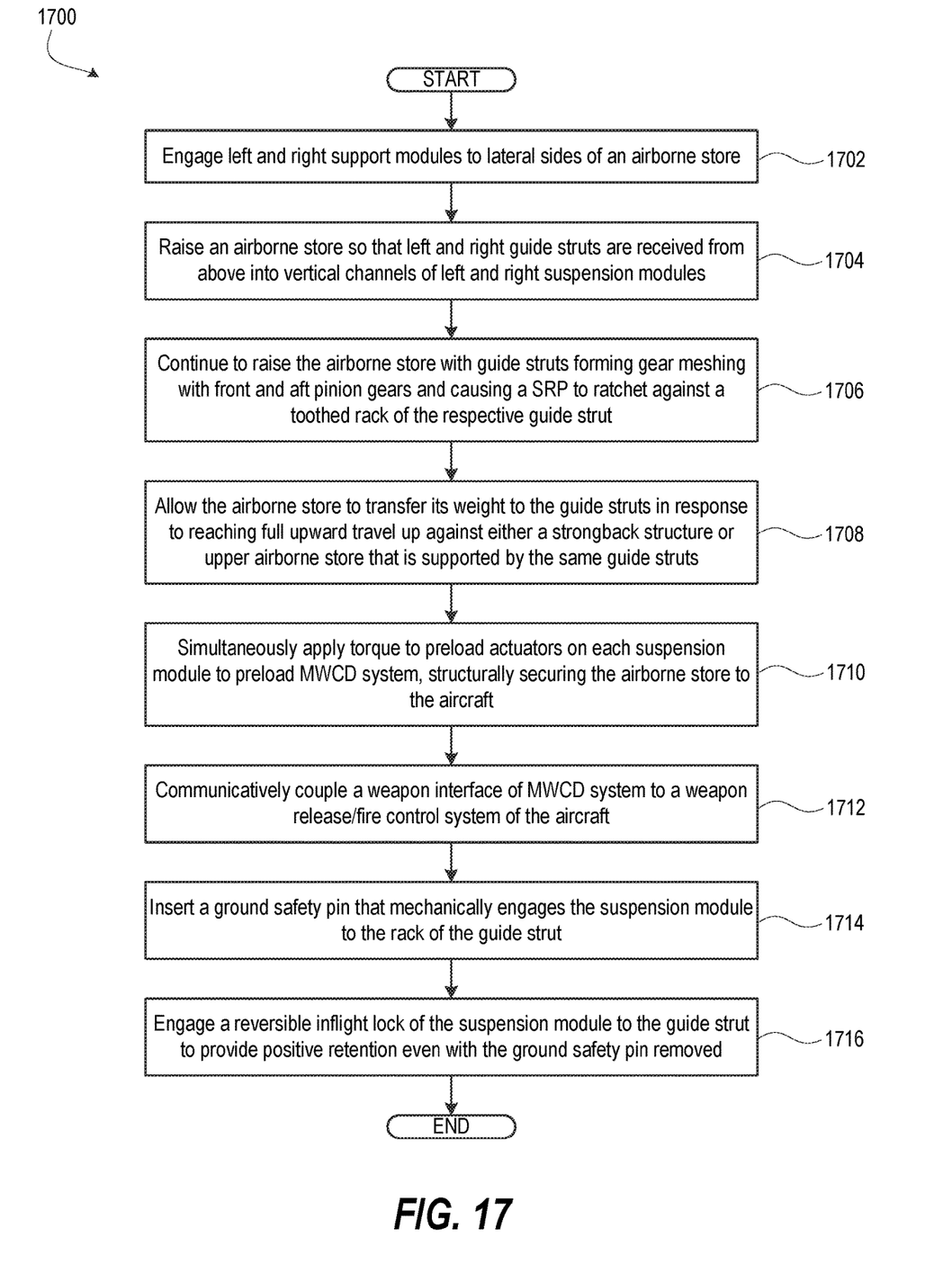
FIG. 17 is a flow diagram illustrating a method of suspending airborne stores on an MWCD system, according to one or more embodiments.

FIG. 17 is a flow diagram illustrating a method 1700 of suspending airborne stores on MWCD system. Left and right support modules are engaged to lateral sides of an airborne store (block 1702). In one or more embodiments, inward pins of each suspension module are loosely inserted into receptacles formed in the lateral sides of the airborne store. Method 1700 includes raising the airborne store so that left and right guide struts are received from above into vertical channels of left and right suspension modules (block 1704). Method 1700 includes continuing to raise the airborne store with guide struts forming gear meshing with front and aft pinion gears and causing a SRP to ratchet against a toothed rack of the respective guide strut (block 1706). Method 1700 includes allowing the airborne store to transfer its weight to the guide struts in response to reaching full upward travel up against either a strongback structure or upper airborne store that is supported on the same guide struts (block 1708). Method 1700 includes simultaneously applying torque to preload actuators on each suspension module to preload MWCD system, structurally securing the airborne store to the aircraft (block 1710). Method 1700 includes communicatively coupling a weapon interface of MWCD system to a weapon release/fire control system of the aircraft (block 1712). Method 1700 includes inserting a ground safety pin that mechanically engages the suspension module to the rack of the guide strut (block 1714). A red "remove before flight" flag is attached to the ground safety pin to provide visual confirmation of safing. Method 1700 includes engaging a reversible inflight lock of the suspension module to the guide strut to provide positive retention even with the ground safety pin removed (block 1716). Then method 1700 ends.

Figure 18:
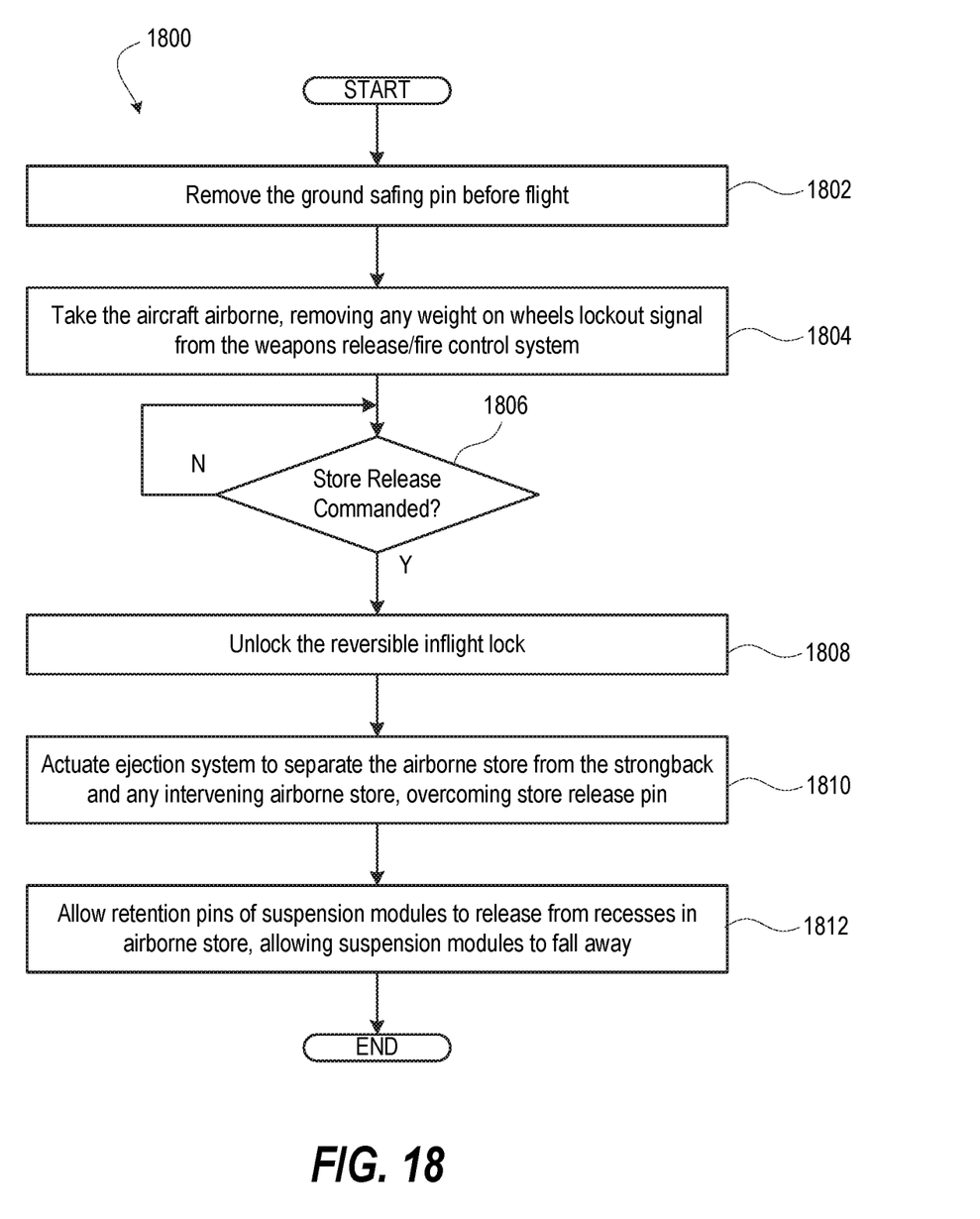
FIG. 18 is a flow diagram illustrating a method of releasing airborne stores that are carried on an aircraft by an MWCD system, according to one or more embodiments

FIG. 18 is a flow diagram illustrating a method of 1800 of releasing airborne stores that are carried on an aircraft by an MWCD system. Method 1800 includes removing the ground safing pin before flight (block 1802). Method 1800 includes taking the aircraft airborne, removing any weight on wheels lockout signal from the weapons release/fire control system (block 1804). A determination is made as to whether a store release is commanded (decision block 1806). In response to determining that store release is not commanded, method 1800 returns to block 1806 to continue monitoring for store release command. In response to determining that store release is commanded, method 1800 unlocks the reversible inflight lock (block 1808). Method 1800 includes actuating ejection system to separate the airborne store from the strongback and any intervening airborne store, overcoming store release pin (block 1810). In one or more embodiments, the airborne store separates from the guide strut and aircraft. Without engagement of pre-load force nor positioning by suspension struts, retention pins of the suspension modules are allowed to release from recesses in the airborne store allowing the suspension modules to fall away from the airborne store (block 1812). Then method 1800 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A modular weapon carriage and deployment (MWCD) system comprising:
   a strongback structure mountable to an aircraft;
   left and right guide struts that have respective upper ends attached to the strongback structure in spaced lateral positions, extending downward in a parallel arrangement, wherein each guide strut comprising a vertically-extending engaging surface; and
   left and right suspension modules engageable to opposite lateral sides of a first airborne store, each suspension module comprising:
   a vertical channel that receives the engaging surface of the corresponding one of the left and right guide struts for relative vertical translation; and
   a locking mechanism that controllably locks to the corresponding engaging surface of one of the left and right guide struts,
   wherein:
   each guide strut comprises at least one of a fore and aft toothed rack; and
   each suspension module comprises:
   a corresponding at least one of fore and aft pinion gears that engage and guide the at least one of the fore and aft toothed racks;
   a pre-load mechanism that engages the at least one of the fore and aft pinion gears; and
   more than one retention pin received within corresponding recesses in the respective lateral side of the first airborne store and that rigidly engage the suspension module to the respective lateral side under a preload force caused by the pre-load mechanism.

2. The MWCD system of claim 1, wherein the left and right guide struts extend vertically sufficiently to receive a second airborne store in vertical alignment with the first airborne store.

3. The MWCD system of claim 1, wherein strongback structure extends longitudinally sufficiently to receive a second airborne store.

4. The MWCD system of claim 1, wherein the locking mechanism comprises a store release pin that ratchetly releases from the at least one of the fore and aft toothed rack as the first airborne store is raised and releases for an ejection force that exceeds a minimum ejection load threshold.

5. The MWCD system of claim 4, further comprising:
   an ejection bladder inserted the airborne store and the vertically adjacent one of: (i) another airborne store; and (ii) the strongback structure; and
   a gas generating container in fluid communication with the ejection bladder to urge separation between the airborne store and the vertically adjacent one of: (i) the other airborne store; and (ii) the strongback structure.

6. The MWCD system of claim 5, further comprising:
a pyrotechnic mechanical coupling between each suspension module and the first airborne store; and
a signal delay interface communicatively coupled to the store release pin to initiate a delayed firing of the pyrotechnic mechanical coupling in response to release of the store release pin.

7. The MWCD system of claim 5, further comprising:
an electrically-actuated latch mechanism that mechanically couples the suspension module to the first airborne store; and
a signal delay interface communicatively coupled to the store release pin and the latch mechanism to perform a delayed actuation the latch mechanism from a coupled to an uncoupled position to release the suspension module from the first airborne store after release of the store release pin.

8. The MWCD system of claim 1, further comprising a ground safing manual lock that locks the respective suspension module to the guide strut with a ground safety pin inserted.

9. The MWCD system of claim 1, further comprising an electrically-actuated reversible inflight lock that selectably engages the respective suspension module to the guide strut.

10. The MWCD system of claim 1, wherein each suspension module comprises a release mechanism that disengages the suspension module from the airborne store after separating from the respective guide strut.

11. The MWCD system of claim 1, wherein the strongback structure comprises right and left pylons, each pylon providing stabilizing surfaces for respective left and right vertical stacks of airborne stores, each pylon positioned between one or more pairs of guide struts.

12. A method of suspending and releasing an airborne store on an aircraft, the method comprising:
engaging left and right support modules to lateral sides of an airborne store;
raising the airborne store so that left and right guide struts are received from above into vertical channels of left and right suspension modules, each guide strut having a vertical toothed rack that gear meshes with a pinion gear within a respective vertical channel;
continuing to raise the airborne store causing a store retention pin in the respective vertical channel to ratchet against the toothed rack of the respective guide strut;
allowing the airborne store to transfer its weight to the guide struts in response to reaching full upward travel up against either a strongback structure or upper airborne store that is supported on the same guide struts; and
simultaneously applying torque to preload actuators on each suspension module to preload the left and right suspension modules, structurally securing the airborne store to the aircraft.

13. The method of claim 12, further comprising actuating an ejection system that assert a downward force on the airborne store that overcomes the suspension retention pin, allowing the airborne store and left and right suspension modules to separate from the suspension struts and aircraft.

14. An aircraft comprising:
an airframe; and
a modular weapon carriage and deployment (MWCD) comprising:
a strongback structure mounted to the airframe; and
left and right guide struts that have respective upper ends attached to the strongback structure in spaced lateral positions, extending downward in a parallel arrangement, wherein each guide strut comprising a vertically-extending engaging surface; and
left and right suspension modules engageable to opposite lateral sides of a first airborne store, each suspension module comprising:
a vertical channel that receives the engaging surface of the corresponding one of the left and right guide struts for relative vertical translation; and
a locking mechanism that controllably locks to the corresponding engaging surface of one of the left and right guide struts,
wherein:
each guide strut comprises at least one of a fore and aft toothed rack; and
each suspension module comprises: a corresponding at least one of fore and aft pinion gears that engage and guide the at least one of the fore and aft toothed racks;
a pre-load mechanism that engages the at least one of the fore and aft pinion gears; and
more than one retention pin received within corresponding recesses in the respective lateral side of the first airborne store and that rigidly engage the suspension module to the respective lateral side under a preload force caused by the pre-load mechanism.

15. The aircraft of claim 14, wherein the locking mechanism comprises a store release pin that ratchetly releases from the at least one of the fore and aft toothed rack as the first airborne store is raised and releases for an ejection force that exceeds a minimum ejection load threshold.

16. The aircraft of claim 14, further comprising:
an ejection bladder inserted the airborne store and the vertically adjacent one of: (i) another airborne store; and (ii) the strongback structure; and
a gas generating container in fluid communication with the ejection bladder to urge separation between the airborne store and the vertically adjacent one of: (i) the other airborne store; and (ii) the strongback structure.

* * * * *